Patented Dec. 9, 1941

2,265,759

UNITED STATES PATENT OFFICE 2,265,759

OIL WELL TREATING FLUID

Howard C. Lawton, Berkeley, Donald A. Limerick, Oakland, and Albert G. Loomis, Berkeley, Calif., assignors to Shell Development Company, San Francisco, Calif., a corporation of Delaware No Drawing. Application June 6, 1939, Serial No. 277,666

11 Claims. (Cl. 252—8.55)

The present invention relates to the treatment of wells with acids for the purpose of increasing the production thereof, and has particular reference to an oil well treating fluid of improved properties.

According to the common method of treating oil wells, a charge of acid is introduced into the well, and after the acid has dissolved a portion of the adjacent acid-soluble formation, the spent treating fluid is withdrawn. Although well treating fluids of the prior art have in many cases greaty increased the production of oil wells, they have not been altogether satisfactory. Often the acid soluble formations, such as calcareous deposits, are partly or wholly saturated with hydrocarbons or covered with paraffinic, asphaltic, or waxy deposits, and are thereby protected from the dissolving action of the acid.

It has been proposed to aid the penetration of acid such as hydrochloric, hydrobromic, nitric, etc., into such mixed mineral-organic deposits by adding to the acid certain surface-tension reducing agents such as ketones, alcohols, etc. The disadvantage of these solvents or surface-tension reducing agents resides, however, in the necessity of using them in relatively large quantities, amounting sometimes to 50% or more of the acid which is technically and economically undesirable since it results in an excessive dilution of the acid and in a high final cost of the treatment.

It is, therefore, the object of this invention to provide a treating agent comprising an acid and a very small quantity of certain wetting or surface-tension reducing agents which permit the acid to attack and to dissolve or to disintegrate the calcareous deposits saturated with hydrocarbon materials or protected by organic deposits, whereby the dilution effect due to the large amount of solvent or surface-tension reducer previously used is avoided, and the effectiveness of the treatment is greatly increased.

A further object of this invention is to provide a well treating fluid comprising an acid and a small amount of certain wetting agents which permit the acid to penetrate and attack calcareous deposits deep within strata traversed by a well.

The foregoing and other objects may be achieved by the use of an oil well treating fluid comprising an acid capable of forming water-soluble salts with the earth formation, such as, for example, HCl, HBr, $HNO_3$, etc., and a small amount of a suitable wetting agent.

Although a great number of wetting agents have been developed and are known, for example, in the textile industry, relatively few of them are suitable in small concentrations for the purposes of this invention. Thus, the wetting agents whose active parts of the molecule are anions in aqueous solutions, are unsuitable for use in treating wells with strong acids, since most of them are only slightly soluble in strong acid solution, or form insoluble or inactive compounds with the usual earth formation salts, such as the salts of calcium, and magnesium, and thereby further plugging the formation. Some of them quickly hydrolyze or are unstable in strong acid solution, or are unsuitable for treating wells due to some other reaction with calcareous or organic materials. Consequently, anion-active wetting agents fail to intensify the action of the acid in dissolving oil-saturated calcareous deposits. As examples of these relatively ineffective types of compounds, the following may be given: sulphated alcohols, such as those known to the trade as "Tergitols," "Gardinols," etc., sulphonated ester salts, sulphonated derivatives of alkyl substituted cresylic acid, alkyl aryl sulphonates ("Nacconols"), sulphonated fatty oils, such as sulphonated castor oil, etc.

On the other hand, the wetting agents most suitable for use in treating oil wells with acids have been found to possess the following properties:

1. They are soluble in acid, such as the 15% hydrochloric acid commonly used in well treatments, and do not hydrolyze quickly therein, but retain their effctiveness for at least 4 to 6 hours on standing in acid solution.

2. The effective portions of the molecules of these substances form surface active cations in acid solution, whereby the possibility of the formation of insoluble compounds with calcium, magnesium or other metal ions in the well or of the earth formation which would reduce their effectiveness is precluded.

Several important advantages are gained by the use of wetting agents having the above properties during acid treatment of wells, and are, namely, that (1) the reaction starts slowly but goes to completion which is not always the case when water-immiscible solvents are used together with the acids; (2) the acid solution of the wetting agent easily penetrates the formation so that secondary calcareous deposits within it are removed; (3) the wetting agents help to prevent acid corrosion of the perforated liner, casing, etc., so that substantially less corrosion inhibitor is required; (4) a single solution can be used and not two as is usually the case when solvent and acid are used; (5) no emulsions of the acid-in-oil type are formed, but rather emulsions of the oil-in-acid type may be formed with the acid as the continuous phase; i. e., the acid remains available to dissolve the calcareous material; and (6) the cost of the wetting agent is considerably lower than any known satisfactory solvent because of the small amount of wetting agent required.

A large group of polar compounds which yield surface active cations in acid solution and of which the molecules contain an oleophilic portion of at least eight carbon atoms and a hydrophilic portion, have been found to be effective for the purpose of this invention. The oleophilic portion may be a long straight or branched chain hydrocarbon, an alkylated aromatic or naphthenic ring, etc. The hydrophilic part of the molecule may have a single or several solubilizing or hydrophilic groups, depending upon the length of the hydrocarbon portion. Such groups as those containing —OH, —C=O, —C(=O)—O—, —NH$_2$, —Cl, —Br, —SH, etc., and their derivatives and combinations thereof may be used to increase the water-solubility of the wetting agent, or the solubility may be increased by introducing double bonds into the molecule. Proper choice and balance of the functional groups are necessary to obtain the desirable solubility, stability in acid solution, and cation surface activity in a wetting agent for use in the present invention.

A preferred group of wetting agents applicable to the present invention are the onium compounds having wetting and penetrating properties. The onium compounds, otherwise known as "onium salts," contain a nuclear atom, such as nitrogen, phosphorus, sulphur, etc., which for simplicity may hereinafter be called X. For the present invention at least one suitable organic residue and an acid anion are attached to the nuclear atom X, the rest of the valences being satisfied with hydrogen atoms in a manner analogous to ammonium.

A suitable organic residue contains an oleophilic group, such as and preferably, a hydrocarbon group of at least eight carbon atoms. The organic residue may also contain a chain comprising solubilizing or hydrophilic groups interrupting said chain or attached thereto. For example, the organic residue may be a hydrocarbon or substituted hydrocarbon or acyl group directly attached to the nuclear atom X, or any such groups joined to X through an oxygen or nitrogen atom attached to X by a lower hydrocarbon or substituted hydrocarbon group. Any of the otherwise unreplaced hydrogen atoms bound to the nuclear atom or the nitrogen atom in the chain of the organic residue may be replaced by lower hydrocarbon or substituted hydrocarbon groups with or without ring formation.

The acid anion may be the anion of any acid which is sufficiently strong to ionize in acidic oil well treating fluids. Anions, such as chloride, bromide, iodide, acetate, and nitrate ions, are preferred as these form soluble calcium and magnesium salts.

Of these onium compounds, the quaternary ammonium and phosphonium and pyridinium salts have been found to be particularly effective due to their stability in aqueous acid solution and may be represented by the general formula:

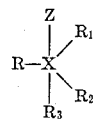

wherein X stands for the onium atom nitrogen or phosphorus, R is a hydrocarbon or substituted hydrocarbon or acyl group directly attached to X or any such groups joined to X through an oxygen or nitrogen atom attached to X through a hydrocarbon or substituted hydrocarbon group, R containing a terminal hydrocarbon group of at least eight and preferably at least ten carbon atoms, Z is an acid anion, and R$_1$, R$_2$, R$_3$ are all the same or only two alike or all different and represent hydrogen, alkyl, aryl, substituted alkyl or aryl radicals or all together represent a carbon chain attached by one single bond and one double bond to X and forming therewith an unsaturated heterocyclic group.

As examples of the group of compounds represented by this general formula, the following compounds may be employed in the present oil well treating fluid:

1. Trimethyl octadecyl ammonium bromide, CH$_3$—(CH$_2$)$_{16}$—CH$_2$—N(CH$_3$)$_3$Br is typical of a group of effective compounds in which the three methyl groups may also be ethyl, propyl, butyl, phenyl, methyl and two ethyl, propyl and two methyl, phenyl and two ethyl, methyl ethyl propyl, butyl methyl amyl, etc., or in which the octadecyl group may be a hydrocarbon of greater or lesser number of carbon atoms but not less than eight and preferably greater than ten, or in which the bromide group may be replaced by a chloride, iodide, acetate, nitrate, etc.

2. Triethyl hexadecyl phosphonium bromide, (C$_2$H$_5$)$_3$—P—(Br)C$_{16}$H$_{33}$, or similar compounds.

3. Cetyl pyridinium bromide

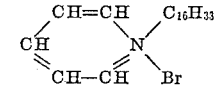

4. Lauryl quinaldinium bromide

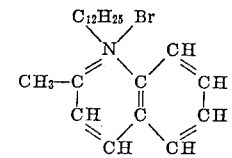

5. The quaternary salts of the compounds commercially known as "Sapamine" may be illustrated by the quaternary salt of diethyl aminoethyl oleyl amide:

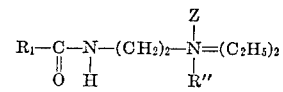

wherein

is oleyl, but may also be, for instance, myristyl, stearyl, etc., and R'' represents hydrogen atom, alkyl, aryl, or substituted alkyl or aryl radicals, and Z is an acid anion.

Also found effective for the purpose of this invention are the ternary sulphonium salts which are similar, except for the lesser valence of the nuclear atom, to the quaternary ammonium and phosphonium salts described under the above general formula. The compound, Me. Et. S. (SO$_4$ME)C$_{16}$H$_{35}$ may be mentioned as illustrative of a suitable sulphonium salt.

Another preferred group of cation active compounds of the same general type are certain basic condensation products of organic carboxylic acids and amino-alcohols or diamines or similar compounds having an oleophilic group of at least eight carbon atoms and being cation-active wetting agents.

This basic type of compound, it is believed, forms neutral salts by reaction with acids, for example monobasic acids, such as hydrochloric and hydrobromic acid, acetic acid, etc., or under proper conditions with alkyl or aryl substituted mineral acids, and in acid solution these salts are cation active. Thus, these basic compounds may be used as such or as their neutral salts in the present invention and are particularly adaptable because of their excellent wetting and penetrating power.

The basic compounds may be designated by the general formula

wherein N is a nitrogen atom, R is a hydrocarbon or substituted hydrocarbon or acyl group directly attached to N or any such groups joined to N through an oxygen or nitrogen atom attached to N through a hydrocarbon or substituted hydrocarbon group, R containing a terminal hydrocarbon group of at least eight and preferably ten carbon atoms depending on the number and strength of the hydrophilic groups in the molecule, and $R_1$ and $R_2$ are the same or different and stand for hydrogen, and alkyl and aryl radicals, which may be substituted by hydroxy, or alkoxy radicals, halide atoms, etc.

Below are several groups of these basic compounds which are given here merely by way of illustration, trade-names being used in some cases:

1. Amidols,

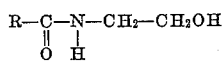

such as the amidols of cocoanut oil fatty acids. These compounds are particularly effective in concentrations of 0.25% to 0.5% by weight of acid. The amidols of fatty acids of this formula in which R is greater than $C_{14}$ are not applicable due to their low solubility in aqueous acid solution. Hence, the amidols of cotton-seed oil ($C_{16}$—$C_{18}$) fatty acids are ineffective. However, the addition of more hydrophilic groups will offset the effect of the increased length of the oleophilic group or the solubility may be increased by introducing double bonds into the molecule.

2. "Sapamines,"

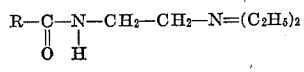

are most effective in concentration of 0.025 to 0.5% by weight of acid. Although mentioned above, as the neutral "onium compound" the "Sapamines" are included here also for the sake of completeness. Both the amidols and the "Sapamines" do not hydrolyze rapidly and retain their effectiveness after standing for 18 hours in acid solution.

3. "Ninols,"

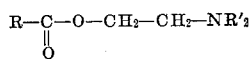

wherein R and R' are consistent with the general formula above, have a maximum effectiveness in concentrations of 0.05 to 0.5%. Although they hydrolyze somewhat more rapidly than amidols or "Sapamines," they may be used in treating fluids of this invention.

It is to be understood that the several specific compounds or groups of compounds herein presented are merely illustrative of the present invention. Further, the concentrations of wetting agents mentioned hereinabove denote the range of maximum effectiveness and not the total range of effectiveness which may vary from a fraction of 1% to about 1% or more, but preferably less than 1%.

The treating fluids prepared according to the present invention are particularly adapted to and have been described as applied to the removal of calcareous deposits which are normally protected from the dissolving action of the acid by hydrocarbon materials or organic deposits and are exceptionally effective for this purpose due to the fact that the wetting agents herein described reduce the interfacial tension between oil and aqueous acid to practically zero. However, due to absorption of these wetting agents on the surface of the calcareous deposits, a retarding or sustaining action of the acid is also acquired which allows the acid to penetrate deeply into the formation before being spent and prevents quick disintegration of the deposits adjacent the borehole with resultant mere enlargement of the well cavity. Hence, it is possible to apply the present treating fluids not only to the removal of calcareous deposits which are saturated with hydrocarbons or protected by organic deposits but also to the removal of calcareous deposits which react too quickly with acid, whereby penetration of the acid deep into the formation is insured with resultant greater permeability upon withdrawal of the spent acid. For the latter purpose, aqueous solutions of acid, such as hydrochloric (5–25% by weight) containing 0.05–2.0% by weight of a cation active wetting agent are preferred, although greater or lesser amounts may be used, if desired.

In practice, the treating fluid of the invention is prepared by dissolving one of the above mentioned wetting agents in dilute acid, such as hydrochloric acid (5% to 25%, preferably 15% by weight), and the solution introduced into the well in any conventional manner. The solution may be forced into the calcareous deposit or into the formation in order to remove secondary deposits by the known methods of applying air or gas pressure or by a load of oil on top of the acid solution. The spent acid is removed by swabbing, bailing or pumping after completion of the reaction. The well can then be produced in the normal manner.

It is not necessary that the wetting agents be preferentially soluble in either water or oil for the purpose of this invention, but rather that the molecule be properly balanced so that an effective amount may be dissolved in aqueous acid solution while at the same time retaining the desired surface activity necessary to permit the acid to penetrate through the organic matter to the acid soluble calcareous deposits in the well.

Furthermore, the compounds known as nitrogen bases are ineffective for the purpose of the present invention due in part, it is believed, to the fact that the molecule of such bases does not contain an oleophilic hydrocarbon group of sufficient length or the hydrophilic portion of the molecule is not properly balanced by an oleophilic group or the effective portion of the molecule does not show cation surface-activity. Hence, such bases as aniline, pyridine, quinoline, etc., or their common derivatives are ineffective for the purpose of this invention. However, it is possible that these materials may be used as a substructure in the preparation of wetting agents that may be suitable for the present invention.

It must be further emphasized that according to the present invention, the wetting agents must be chosen or prepared with attention directed to the essential properties necessary for effectiveness in treating wells. That is, the properties of proper balance between the hydrophilic and hydrophobic groups, capability of ionizing into a cation which is surface active and solubility and stability in acid solution must all be found within the molecule of the wetting agents suitable for the purpose of this invention.

We claim as our invention:

1. A well treating fluid comprising an acid capable of forming water-soluble salts with the earth formation and a small amount of a wetting agent having the general formula

wherein X stands for an atom chosen from the group consisting of nitrogen and phosphorus, R represents an organic residue containing a terminal hydrocarbon group of at least eight carbon atoms, Z is an acid anion, and $R_1$, $R_2$, and $R_3$ are members of the group consisting of hydrogen atom, and aliphatic and aryl radicals.

2. A well treating fluid comprising an acid capable of forming water-soluble salts with the earth formation and a small amount of the amidols of cocoanut oil fatty acids.

3. A well treating fluid comprising an acid capable of forming water-soluble salts with the earth formation and a small amount of a wetting agent having the general formula

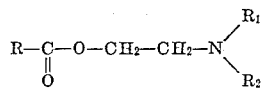

wherein is a hydrocarbon group of at least eight carbon atoms, and $R_1$ and $R_2$ are members of the group consisting of hydrogen atom, and aliphatic and aryl radicals.

4. A well treating fluid comprising an acid capable of forming water-soluble salts with the earth formation and a small amount of a wetting agent having the general formula

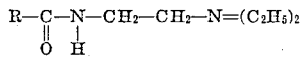

wherein R is a hydrocarbon group of at least eight carbon atoms.

5. A well treating fluid comprising an acid which forms water-soluble salts with the earth formation and a small amount of a water-soluble quaternary ammonium salt having attached to the nitrogen atom an acid anion and an organic residue containing hydrophilic and oleophilic groups, said oleophilic group having a chain of at least eight carbon atoms, said salt yielding a surface-active cation in aqueous acid solution.

6. A well treating fluid comprising an acid which forms water-soluble salts with the earth formation and a small amount of a basic organic compound capable of forming in aqueous acid solution a surface-active cation, said compound containing a nuclear nitrogen atom to which is attached an organic residue containing a terminal hydrocarbon chain of at least eight carbon atoms.

7. A well treating fluid comprising an acid which forms water-soluble salts with the earth formation and a small amount of a water-soluble quaternary ammonium salt capable of yielding a surface-active cation in aqueous acid solution, said compound having attached to the nitrogen atom an acid anion and an organic residue containing a terminal hydrocarbon chain of at least eight carbon atoms, said organic residue having a chain comprising the hydrophilic group

attached to the quaternary nitrogen atom through a divalent organic group.

8. A well treating fluid comprising an acid which forms water-soluble salts with the earth formation and a small amount of a basic organic compound capable of forming in aqueous acid solution a surface-active cation, said compound containing a nuclear nitrogen atom to which is attached an organic residue containing a terminal hydrocarbon chain of at least eight carbon atoms, and a chain comprising the group

attached to the nuclear nitrogen atom through a divalent aliphatic group.

9. A well treating fluid comprising an acid which forms water-soluble salts with the earth formation and a small amount of a basic organic compound capable of forming in aqueous acid solution a surface-active cation, said compound containing a nuclear nitrogen atom to which is attached an organic residue containing a terminal hydrocarbon chain of at least eight carbon atoms, and a chain comprising the group

attached to the nuclear nitrogen atom through a divalent aliphatic group.

10. A well treating fluid comprising an acid which forms water-soluble salts with the earth formation and a small amount of a basic organic compound capable of forming in aqueous acid solution a surface-active cation, said compound containing a nuclear nitrogen atom to which is attached an organic residue containing a terminal hydrocarbon chain of at least eight carbon atoms, and a chain comprising the group

attached directly to the nuclear nitrogen atom.

11. A well treating fluid comprising an acid which forms water-soluble salts with the earth formation, and a small amount of a water-soluble organic onium compound selected from the group consisting of ammonium, phosphonium and sulfonium compounds, said compound having attached to the nuclear atom an acid anion and an organic residue containing hydrophilic and oleophilic groups, said oleophilic group having a terminal chain of at least eight carbon atoms.

HOWARD C. LAWTON.
DONALD A. LIMERICK.
ALBERT G. LOOMIS.